June 6, 1961  M. KATZIN  2,987,720
DOUBLE PULSE LENGTH RADAR
Filed Dec. 5, 1950  3 Sheets-Sheet 1
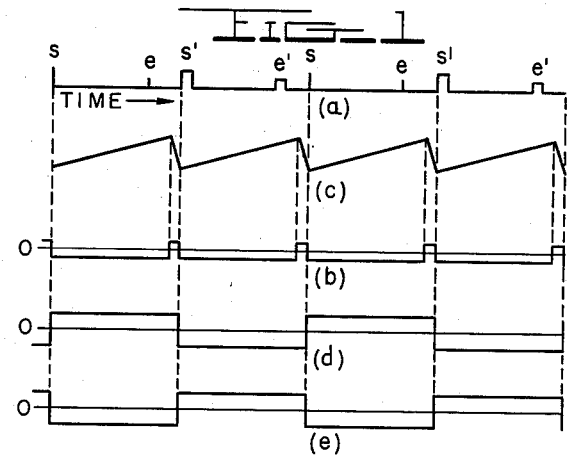
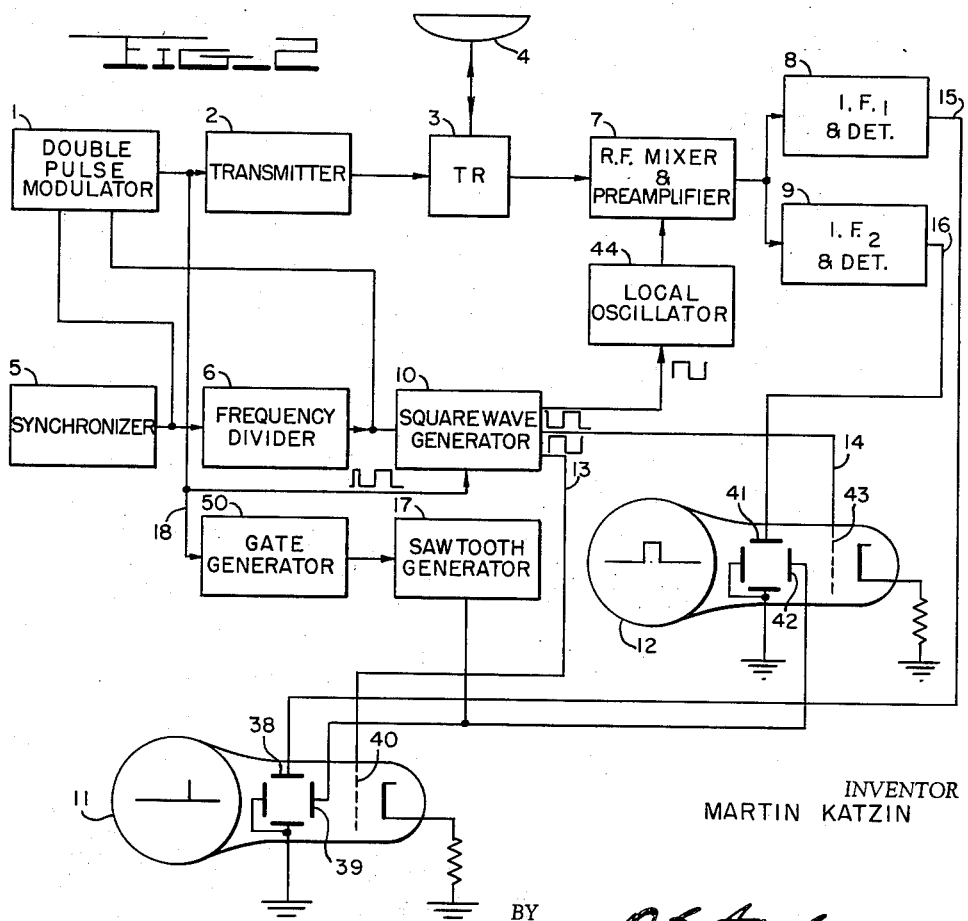
INVENTOR
MARTIN KATZIN
BY
ATTORNEYS June 6, 1961  M. KATZIN  2,987,720
DOUBLE PULSE LENGTH RADAR
Filed Dec. 5, 1950  3 Sheets-Sheet 2
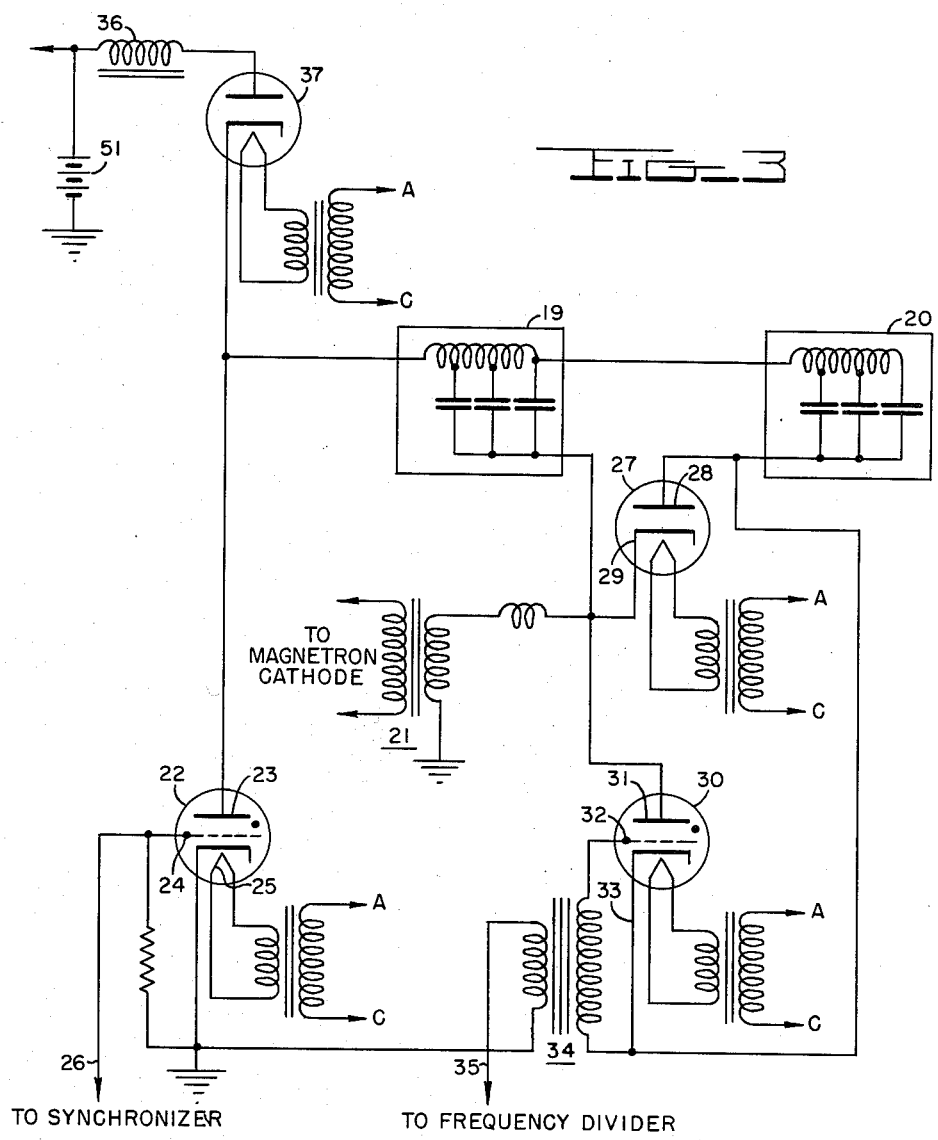
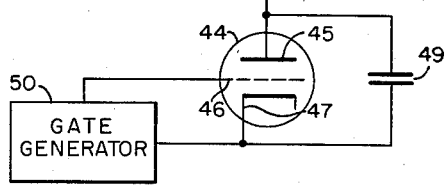
INVENTOR
MARTIN KATZIN
BY
ATTORNEYS June 6, 1961 M. KATZIN 2,987,720
DOUBLE PULSE LENGTH RADAR
Filed Dec. 5, 1950 3 Sheets-Sheet 3
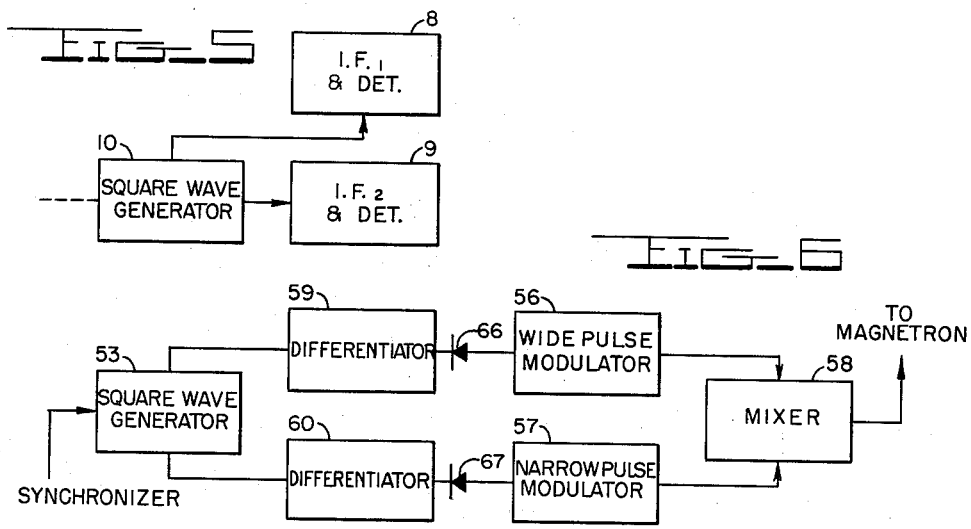
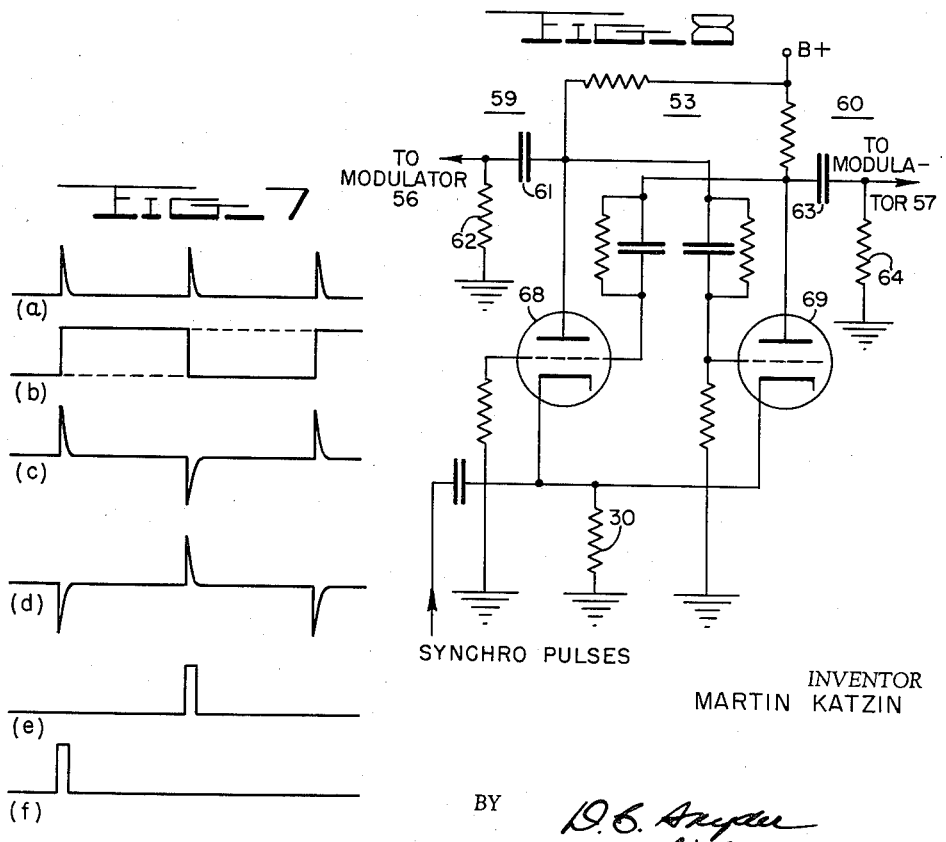
INVENTOR
MARTIN KATZIN
BY
ATTORNEYS 2,987,720
DOUBLE PULSE LENGTH RADAR
Martin Katzin, % Naval Research Laboratory,
Anacostia Station, Washington, D.C.
Filed Dec. 5, 1950, Ser. No. 199,273
4 Claims. (Cl. 343—17.1)
(Granted under Title 35, U.S. Code (1952), sec. 266)

The present invention relates to a pulse echo detection system.

The conventional pulse echo detection system transmits constant duration pulses which have been found unsuitable under certain conditions.

One such condition has been the application where radar apparatus is utilized over choppy water areas. It has been discovered that the target echo pulses can be more easily distinguished from "sea clutter" (echoes originating from the waves in the ocean or other body of water), when shorter duration pulses are used (.1 microsecond pulses have been found most satisfactory). Short pulses however necessitate a wider bandwidth receiver which raises the internal noise of the reeciver and thus decreases the signal-to-noise ratio. The use of wider pulses allows a narrower bandwidth receiver to be used, which improves the signal to internal noise ratio and allows better results to be obtained for echo pulses traversing ranges longer than the maximum sea clutter range.

The present invention utilizes the advantages of both the short and long pulses by providing a system wherein transmitted pulses of both short and long types are transmitted in a definite predetermined sequence. Two separate receiver channels are utilized, one being of wide bandwidth to receive the short pulses, the other being of a narrow bandwidth to receive the longer duration pulses. Two separate beam traces are provided for the cathode ray tube indicator means, one for each pulse type each being in isochronism with the corresponding transmitted pulse. The respective traces or channels are blanked in the same sequence as the corresponding sequence of the transmission of the wide and narrow pulses so that each indicator beam trace presents the echoes received only from its corresponding pulse length.

Accordingly, one object of the present invention is to provide a pulse echo detection system wherein the echo pulses are more easily distinguished from random sea clutter and the like and noise.

Another object of the present invention is to provide an echo detection system, which with the minimum amount of apparatus, gives the advantage of the higher signal-to-noise ratio of the wider pulse and also the advantage of the narrow pulse for discriminating from the random sea clutter.

Another object of the present invention is to provide a relatively simple pulse echo detector apparatus for simultaneously giving the advantages of narrow and wide pulse transmission.

Other objects will become apparent from the disclosures to follow and the drawings wherein:

FIGURE 1 discloses the various voltage and signal waveforms found throughout the system which comprises the present invention.

FIGURE 2 is the block diagram of the components used with the present invention.

FIGURE 3 discloses the circuit details of one type of modulator.

FIGURE 4 shows the sweep generator circuit.

FIGURE 5 is an alternative embodiment of the present invention.

FIGURE 6 is an alternative embodiment for the modulator shown in FIGURES 2 and 3.

FIGURE 7 shows the waveforms found in various parts of the modulator circuit of FIGURE 6.

FIGURE 8 is a detail circuit diagram of the square wave generator 53 shown in block form in FIGURE 6.

As was previously stated, the present invention utilizes short and long duration pulses transmitted in a definite sequence.

In the example shown in waveform $a$ in FIGURE 1 the short pulses $s$ and the long pulses $s'$ are alternately transmitted so that every other pulse is of a given pulse type. The time between successive transmitted pulses is shown constant but it need not be if the short pulses are used only for the shorter ranges. However, as will be apparent from the descriptive matter to follow, making the time between successive pulses equal simplifies the circuits to be used in the system and results in a more economical apparatus.

The echo pulses $e$ and $e'$ are the echoes from the same target due to the respective short and long transmitted pulses $s$ and $s'$.

Referring now to FIGURE 2, pulse modulator 1 delivers to transmitter 2, which may comprise a magnetron or other type of oscillator, pulses having the sequence and width of the pulses to be transmitted. Element 3 is a well known "T–R box" or duplexer means which prevents the high energy radio-frequency signal output of transmitter 2 from feeding through to the receiver input circuit 7 which utilizes the common antenna 4.

The echo pulses received by antenna 4 are fed to the conventional superheterodyne input circuit 7 comprising an R.F. amplifier mixer and local oscillator circuits. Two separate intermediate amplifier channels 8—9 are provided. One of these channels has a narrow bandwidth to pass the wide received pulses and the other channel has a wide bandwidth to pass the narrow pulses. Of course the last mentioned channel will also pass the wide pulses and for this reason a blanking system for the cathode ray tube indicator means 11 and 12 is required.

The blanking system comprises a conventional square wave generator 10 (such as a multivibrator) which is synchronized with pulses fed from the output of modulator 1 so that during the period of time when echoes are expected from a given type pulse, one of the cathode ray tubes is blanked (that is, the beam is cut off or intensity decreased so that no trace appears on the screen) and the beam of the other tube is unblanked. Thus, referring to waveforms $a$, $d$, and $e$ of FIGURE 1, it will be seen that between the transmission of a narrow pulse and the next wide pulse, square wave generator 10 feeds a positive voltage waveform $d$ to the control grid of one of the cathode ray tubes thereby unblanking the sweep trace therein, and correspondingly feeds a negative voltage waveform $e$ to the control grid of the other cathode ray tube thereby cutting off or blanking its sweep trace. The result is that echo $e$ appears on only one of the cathode ray tube screens and echo $e'$ appears only on the other tube.

The sweep system FIG. 2 comprises any suitable and conventional sawtooth voltage generator 17 whose output is synchronized with the transmitted pulse. Thus, as seen in waveform $c$ of FIG. 1, the sawtooth voltage waveform is initiated in isochronism with each transmitted pulse. The transmitted pulses are separated by equal time intervals, so that only one sweep generator is needed for both cathode ray tubes 11 and 12, and hence beam deflection means 39 and 42 both may be coupled to the output of sweep generator 17.

The circuit details of a suitable conventional sweep generator 17 are shown in FIGURE 4. The circuit there shown comprises a charging circuit of a condenser 49 and a resistance 48. Tube 44 is a discharging means whose conduction is controlled by gate generator 50. Gate generator 50 is a conventional and well known single stability-type multivibrator which operates in isochronism with the transmitted pulses. In the example illustrated gate generator 50 receives its synchronizing pulses from modulator 1. Waveform b of FIG. 1 shows the voltage output of gate generator 50; the negative-going portion of the wave there shown renders tube 44 non-conductive for the desired duration of the sweep, condenser 49 charging toward the B plus voltage value.

It should be understood that the particular sawtooth generator shown in FIGURE 4 is exemplary only and other suitable circuits could be substituted therefore.

If it is desired to have the pulse intervals unequal, the blanking voltage applied to the respective cathode ray tubes 11—12 from the square wave generator would be applied for different durations. A separate sawtooth generator for each pulse interval would be required to provide the sweep traces for the respective cathode ray tubes 11—12.

Although two separate cathode ray tubes have been shown, a single cathode ray tube could be used with separate traces without deviating from the scope of the present invention.

FIGURE 5 shows an alternative embodiment of the present invention wherein the blanking voltage is applied to the respective intermediate channels 8 and 9 instead of the cathode ray tubes 11—12 as shown in FIGURE 2. The blanking voltage is used to render the intermediate frequency amplifier stages successively non-conductive so as to prevent the undesired signals from reaching the deflection plates of the associated cathode ray tube.

Where transmitter 2 includes a magnetron oscillator, a problem of frequency shift is present. The magnetron generates a slightly different frequency when it is caused to oscillate for different durations. The exact reason for this phenomenon is not clear. However the effect of the variation in transmitted frequency on the receiver is nullified by changing the frequency of the local oscillator 44 with the change in magnetron frequency for the period between transmitted pulses of different length.

This is conveniently accomplished by utilizing a portion of the output voltage from square wave generator 10 to control the local oscillator frequency.

If local oscillator 44 includes a reflex velocity modulated tube of the type disclosed on pages 4–70 to 4–80 of the book, "Principles of Radar," by the Massachusetts Institute of Technology Staff, 1944 edition, the square wave of voltage from square wave generator 10 may be fed to the repeller or reflector electrode which varies the local oscillator frequency. In this manner, the frequency of the signals appearing in the intermediate frequency stages 8—9 are kept constant irrespective of the change in magnetron frequency.

FIGURE 3 shows the details of one type of modulator 1 shown in block form in FIGURE 2. As previously stated, the modulator in the embodiment disclosed in the drawings must produce alternate narrow and wide pulses.

To accomplish this, time delay or pulse forming networks 19 and 20 are connected in parallel insofar as the charge path is concerned through a diode 27 whose anode 28 is connected so that it is conductive only during the charging of network 20. The networks 19 and 20 are charged from a high-voltage source through a resonant charging choke 36 and a holding diode 37.

The charge path for networks 19 and 20 is completed through the primary winding of a pulse transformer 21. The secondary of transformer 21 is coupled to the magnetron cathode. The magnetron is represented by block 2 in FIGURE 2.

Thyratron tubes 22 and 30 provide discharge paths respectively for charging circuits 19 and 20. The discharge process of these networks is initiated by the firing of thyratron tube 22 which is fired on every cycle of the pulses generated by synchronizer or time base generator 5. Thyratron 30, on the other hand, is fired every other cycle of the output of synchronizer 5 by means of a frequency divider 6 which divides by a factor of 2. Any well known suitable frequency divider obviously may be used. Synchronizer 5 may be any suitable pulse generating device such as a free running blocking oscillator circuit.

The operation of the modulator 1 is as follows:

The condensers of network 19 charge up to the peak value of the voltage between the plate of diode 37 and ground. This voltage has a sinusoidal character due to the transient oscillation resulting from the presence of coil 36 and the capacity of the circuit. This peak voltage is higher than the value of the voltage from direct current voltage source 51.

The condensers of network 20 are in parallel with the condensers of network 19 as far as the charge path is concerned and so also charge up to the peak voltage present between the plate of diode 37 and ground through the charging path, which includes the transformer 21, through diode 27, the inductance of network 19, diode 37, inductance 36 and the direct current voltage source 51.

Diode 37 becomes non-conductive when the voltage between its plate and ground is less than the voltage to which the capacitors of networks 19 and 20 are charged, and so acts as a charge holding diode.

A positive pulse applied to the grid of thyratron 22 through conductor 26 causes it to conduct, which causes network 19 to discharge in a definite time depending on the parameters of the delay line network 19. Due to the inductance 36, which tends to prevent any sudden change of current flow, the network 19 discharges through the path including transformer 21, and thyratron 22. The current flowing through transformer 21 produces a high voltage pulse of a correct polarity to energize the magnetron coupled thereto so as to cause it to oscillate for the duration of the pulse, which ends when the delay network is discharged.

Diode 27 located between network 19 and 20 prevents discharge of network 20 until thyratron 30 is rendered conductive. Thyratron 30 is rendered conductive by the pulse output from frequency divider 6. When this occurs, network 20 is effectively in series with network 19. The firing of thyratron 22 then initiates the long pulse since the time required for the circuit to discharge is increased by the addition of delay network 20.

It should be noted that the modulator shown in FIGURE 3 is very flexible to changes in pulse sequence. Thus if frequency divider 6 were made to divide by 3, the pulse sequence would be two narrow pulses and one wide pulse.

The modulator of FIGURE 3 is claimed in a co-pending U.S. application Serial No. 181,536, filed August 25, 1950, now U.S. Patent No. 2,749,452, issued June 5, 1956.

Although the modulator circuit just described is preferred for its flexibility among other reasons, the present invention is not dependent on the details of the modulator. For example, FIGURE 6 discloses an alternative form of the modulator which produces alternate wide and narrow pulses.

The wide and narrow pulses originate in respective wide and narrow pulse modulators 56—57 shown in block form in FIGURE 6. The modulators 56—57 may be any suitable device for producing a high voltage pulse of a given predetermined width which is initiated in synchronism with a synchronizing pulse fed thereto. Such a device is disclosed in FIGURE 31, page 6–46 of the book entitled "Principles of Radar," by the Massachusetts Institute of Technology, 1944 edition.

The output of modulators 56—57 are fed to a suitable mixer or signal combining circuit 58 whose output is coupled to the magnetron in a conventional manner.

It should be clear that modulators 56—57 must produce wide and narrow pulses at respectively different instants and synchronizing pulses are accordingly successively fed to the modulators 56—57 from square wave generator 53 through conventional differentiating circuits 59 and 60.

Referring to the curves of FIGURE 7 for a better understanding of the embodiment of FIGURE 6, synchronizing pulses (curve a) are used to synchronize a conventional multivibrator square wave generator 53 shown in detail in FIGURE 8. The output from square wave generator 53, the respective solid and dotted curves b, are fed to conventional two peaking or differentiaitng circuits 59—60 which produce synchronizing pulses, curves c and d, which are 180 degrees out of phase with each other. These pulses, as previously explained, are fed to respective pulse modulators 56 and 57 when the wide and narrow pulses are produced as shown by curves f and e which are in synchronism with the positive pulses of waveforms c and d. The negative pulses of curves c and d may be eliminated if desired by diode rectifiers 66—67 placed between the differentiator circuits 59—60 and modulators 56—57.

The square wave generator 53 comprises a conventional cathode coupled two stability type trigger circuit wherein the current from one tube develops a bias voltage across the common cathode resistance 70 which cuts off the other tube 69. A pulse applied across the cathode resistance from an external source triggers the circuit so that the tube previously in a conductive state becomes non-conducting and vice versa. These external synchronizing pulses of curve a cause a square wave of voltage represented by the solid and dotted curves b to respectively appear at the plates of tubes 68—69 of square wave generating circuit 53.

The narrow pulses of curves c and d are produced by the respective differentiating circuits 59—60 which comprise conventional condenser-resistance networks 61—62, and 63—64.

Many other modifications may be made of the specific embodiments disclosed in the specification and drawings without deviating from the scope of the present invention.

The invention described herein may be manufactured and used by or for the Government of the United States of America for governmental purposes without the payment of any royalties thereon or therefor.

What is claimed is:

1. A double pulse length radar system comprising, a double pulse generator producing equal spaced pulses which are alternately of short and long duration, a radar transmitter and antenna keyed by said double pulse generator, a radar receiver connected to said antenna and having a pair of intermediate frequency amplifier channels, one of said channels being broadbanded and the other narrow banded to accommodate short and long duration received pulses respectively, indicator means providing separate sweep display means for each of said intermediate frequency channels.

2. A double pulse length radar system comprising, a double pulse generator producing equal spaced pulses which are alternately of short and long duration, a radar transmitter and antenna keyed by said double pulse generator, a radar receiver connected to said antenna and having a pair of intermediate frequency amplifier channels, one of said channels being broadbanded and the other narrow banded to accommodate short and long duration received pulses respectively, indicator means providing separate sweep display means for each of said intermediate frequency channels, a sawtooth generator synchronized by said double pulse generator for providing alternate sweeps of said separate display means, and means synchronized with the long duration pulses from said double pulse generator for blanking the sweep display means associated with said broadbanded I.F. channel.

3. A double pulse length radar system comprising, a double pulse generator producing equal spaced pulses which are alternately of short and long duration, a radar transmitter and antenna keyed by said double pulse generator, a radar receiver connected to said antenna and having a pair of intermediate frequency amplifier channels, one of said channels being broadbanded and the other narrow banded to accommodate short and long duration received pulses respectively, a square wave generator producing alternate polarity pulses synchronously with said short and long pulses from said double pulse generator, indicator means providing said separate sweep display means for each of said intermediate frequency channels, a sawtooth generator synchronized by said double pulse generator for providing alternate sweeps of said separate display means, said square wave generator being connected to each of said separate sweep display means in opposite polarity to provide alternate blanking of said sweep display means.

4. A double pulse length radar system comprising, a double pulse generator producing equal spaced pulses which are alternately of short and long duration, a radar transmitter and antenna keyed by said double pulse generator, a radar receiver connected to said antenna and having a single local oscillator and a pair of intermediate frequency amplifier channels, one of said channels being broadbanded and the other narrow banded to accommodate short and long duration received pulses respectively, a square wave generator producing alternate polarity pulses synchronously with said short and long pulses from said double pulse generator, said square wave generator being connected to said local oscillator to control frequency compensation of said receiver in synchronism with frequency drift of said radar transmitter produced by different duration keying pulses, indicator means providing said separate sweep display means for each of said intermediate frequency channels, a sawtooth generator synchronized by said double pulse generator for providing alternate sweeps of said separate display means, said square wave generator being connected to each of said separate sweep display means in opposite polarity to provide alternate blanking of said sweep display means.

References Cited in the file of this patent

UNITED STATES PATENTS

| | | |
|---|---|---|
| 2,176,469 | Moueix | Oct. 17, 1939 |
| 2,423,024 | Hershberger | June 24, 1947 |
| 2,423,082 | Busignies | July 1, 1947 |
| 2,424,984 | Hoffman | Aug. 5, 1947 |
| 2,425,600 | Coykendall | Aug. 12, 1947 |
| 2,568,441 | Fyler | Sept. 18, 1951 |
| 2,946,050 | Wathen | July 19, 1960 |